June 2, 1964

C. W. KUHN ETAL 3,135,849

THERMOSTATIC CONTROL SWITCHES FOR REFRIGERATORS AND THE LIKE

Filed Feb. 28, 1962

United States Patent Office 3,135,849
Patented June 2, 1964

3,135,849
THERMOSTATIC CONTROL SWITCHES FOR REFRIGERATORS AND THE LIKE
Clarence W. Kuhn, Wauwatosa, and Charles Roy Smith, Mequon, Wis., assignors to Cutler-Hammer, Inc., Milwaukee, Wis., a corporation of Delaware
Filed Feb. 28, 1962, Ser. No. 176,354
24 Claims. (Cl. 200—140)

This invention relates to improved thermostatic control switches for refrigerators and the like.

All present day thermostatic control switches using vapor pressure principles in diaphragm type power elements require high spring rate loating springs to limit the excursions of the diaphragm to usable limits. With increasing demand for wide temperature and cut-in and cut-out differential ranges the loading spring rates become very high which results in high internal stresses being set up in the switch and operating mechanism. Such stresses affect the repetitive accuracy of operation, and over periods of time cause deterioration or fall-off in calibration settings. Thermostatic control switches utilizing diaphragm type thermal power elements that eliminate the need for range or calibration loading springs have heretofore been proposed, but their designs have left something to be desired in respect of operation accuracy and quality control in repetitive high quantity manufacture. It is therefore a primary object of the present invention to provide improved forms of thermostatic switches employing diaphragm power elements and other construction which eliminate the use of conventional diaphragm loading springs.

Another object is to provide a basic form of thermostatic control switch of the aforementioned kind which by substitution and/or addition of but a few parts can provide several different versions in respect of range adjustment of cut-in and cut-out points, and with or without auxiliary alarm contacts.

A further object is to provide in a control switch of the aforementioned character an improved snap acting switch mechanism which has two stable operating conditions and provides fast make and break contact operation when positively driven from one to another of its stable operating conditions.

A still further object is to provide in a control switch of the aforementioned kind a novel and improved form of motion transmitting and amplifying mechanism which affords drive of said snap acting switch mechanism from one to the other of its stable operating conditions and vice versa, in response to inward and outward movements of the power element diaphragm without subjecting the latter to any appreciable loading.

A more specific object is to provide a motion transmitting and amplifying mechanism which is characterized by having separate levers for driving the operating member of the snap acting switch mechanism in opposite directions with lost motion thereby rendering the switch mechanism unaffected by range or differential adjustments.

An additional specific object is to provide in a motion transmitting and amplifying mechanism for individual adjustments of the points at which the aforementioned separate levers are each effective to drive the operating member to position affording operation of said switch mechanism from one to the other of said stable operating conditions and vice versa, and A further specific object is to provide an adjusting mechanism for the aforementioned lever system which requires low, constant operating torque to effect changes in range settings in either direction.

Other objects and advantages of the invention will hereinafter appear.

The accompanying drawings illustrate preferred embodiments which will now be described in detail, it being understood that the embodiments illustrated are susceptible of various modifications without departing from the scope of the appended claims.

Referring particularly to FIGS. 1 to 13, they disclose a preferred and basic form of refrigerator control embodying the invention which comprises a thermal responsive power element 30, an operating mechanism enclosing case 32, and a range adjusting knob 34. This form is a so-called "straight range" version wherein "cut-in" and "cut-out" points are simultaneously adjustable while maintaining the differential between such points substantially constant.

Power element 30 is provided with a cup-shaped portion 30a, a pair of side frame portions 30b which integrally join with portion 30a on opposite sides at the upper end of the latter. At corresponding end portions 30b are provided with integral tabs 30c (see FIG. 5) which extend through slots in a mounting bracket 36 and are upset over the opposite side of bracket 36 to secure the latter in place.

Figure 1:
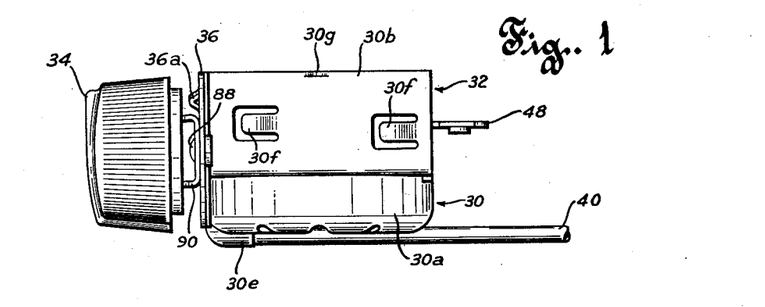
FIGURE 1 is a side elevation view of a thermostatic control switch constructed in accordance with the invention.
Figure 2:
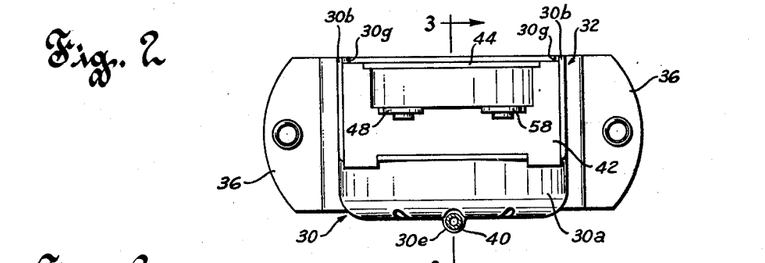
FIG. 2 is a right end view of the control switch shown in FIG. 1.
Figure 3:
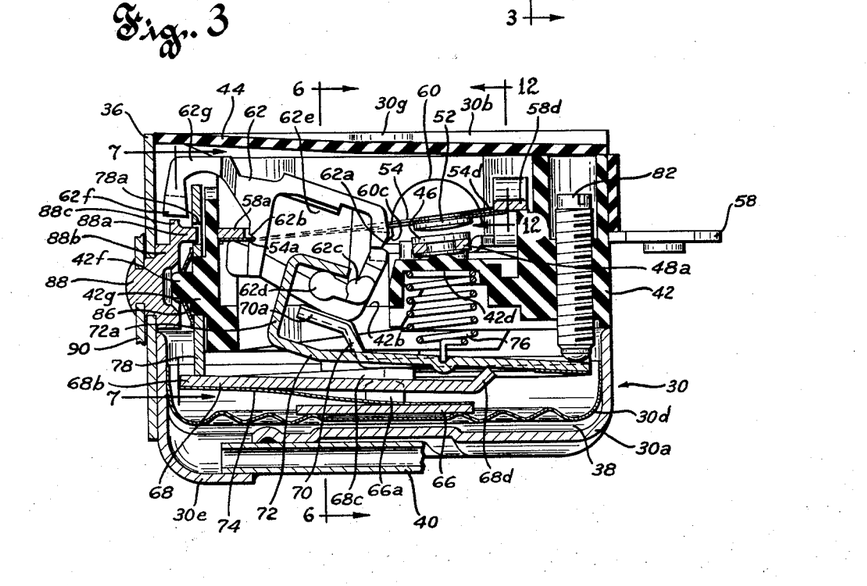
FIG. 3 is a view in cross section taken along the line 3—3 of FIG. 2.
Figure 4:
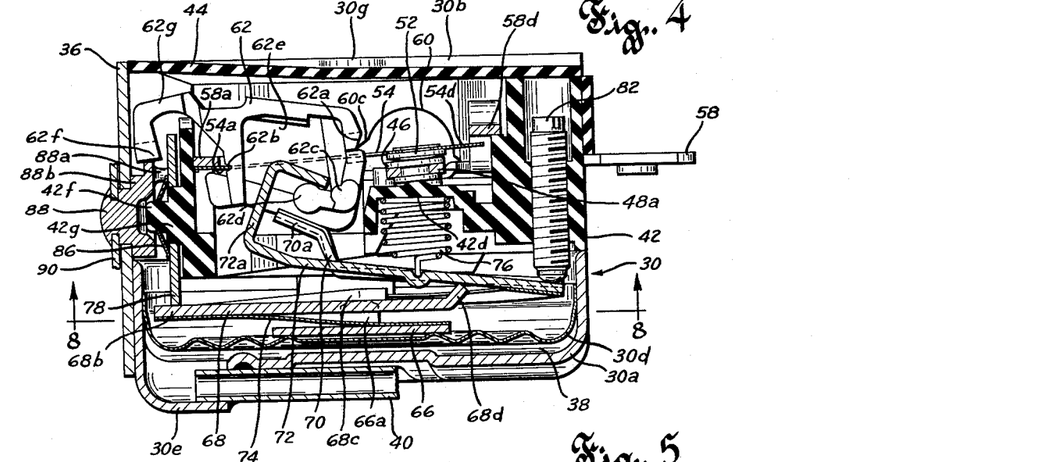
FIG. 4 is a view like FIG. 3 but showing the control switch in another operating condition.
Figure 5:
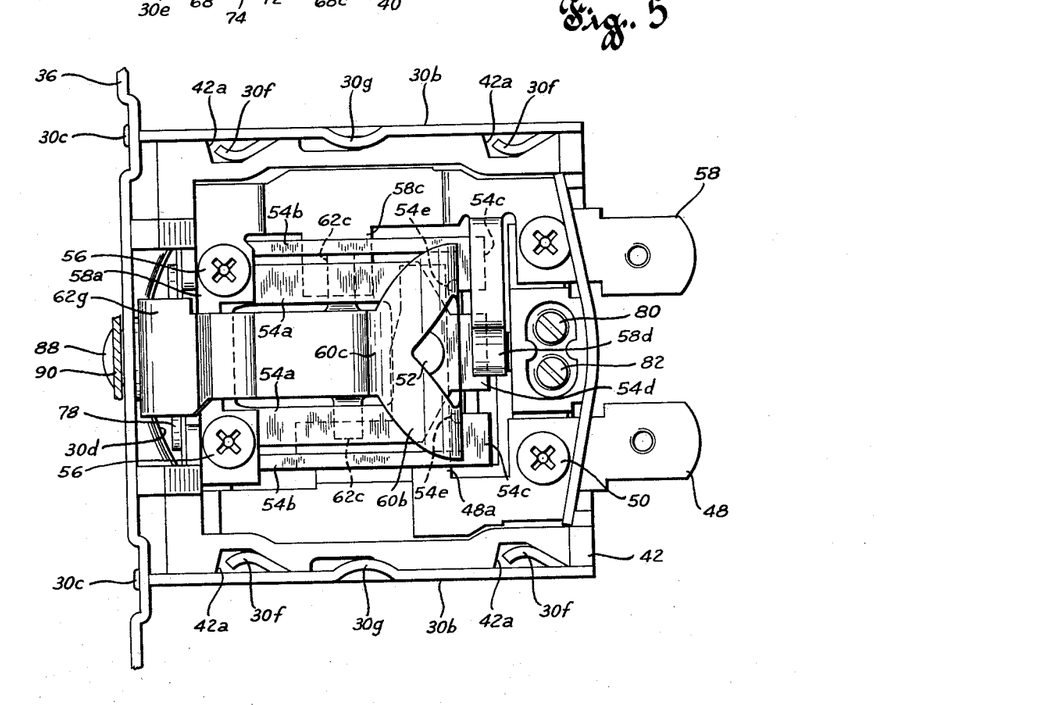
FIG. 5 is a top plan view with a cover removed to show interior mechanism.
Figure 6:
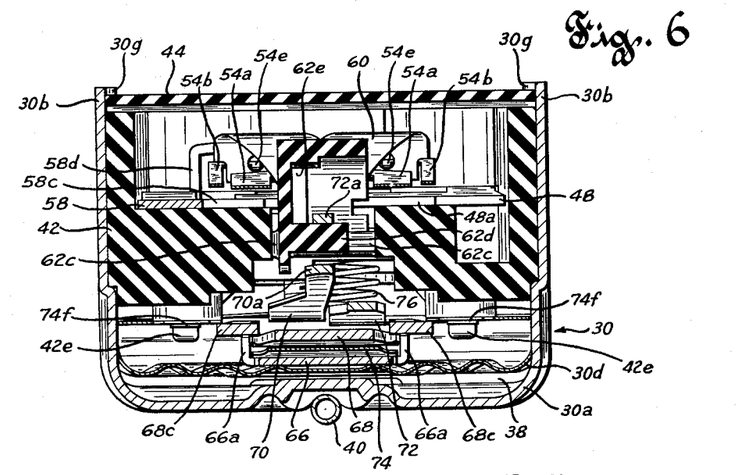
FIG. 6 is a view in cross section taken along the line 6—6 of FIG. 3.

As best shown in FIGS. 3 and 4, power element 30 is provided with a diaphragm 30d which is suitably secured in a sealed relation to the inner wall of the cup portion 30a to form an enclosed diaphragm chamber 38 therewith. A capillary tube 40 penetrates and is sealed to a boss portion 30e which extends downward at one side of the underside of portion 30a. Tube 40, as is well known, is of some definite length and its bore and diaphragm chamber 38 of element 30 are provided with a suitable fill of gas such as Freon (F–22 or F–12) or methyl chloride. Diaphragm 30d is preferably formed in accordance with the teaching of the Smith Patent No. 2,751,935 so that it will move outwardly and inwardly in a linear relation to changes in pressure of the gas in the chamber 38 and tube 40.

A base 42 formed of a suitable molded electric insulating material seats at its lower end against the upper edge of cup-portion 30a on opposite sides between the side from portion 30a and at one end against bracket 36. Tabs 30f struck out of the portions 30b are bent into recesses 42a (see FIGS. 1 and 5) formed in the outer surfaces of the aforementioned sides of base 42 and serve to secure the latter and power element 30 in assembled relation.

A cover 44 formed of a suitable insulating material seats against the upper surface of base 42 and is secured in place by inwardly extending tabs 30g formed along the upper edges of the portions 30b.

A stationary contact 46 is mounted on an arm 48a of stationary contact terminal member 48 (see FIGS. 5 and 11) that seats within base 42 where it is secured by a screw 50. A movable contact 52 is secured in overlying working relation to contact 46 to the free end of a central hollow rectangular portion 54a of a metallic reed member 54 which is of a form best shown in FIG. 13. At its other end member 54 is provided with spaced apart openings to accommodate screws 56 which also penetrate the arm 58a of a terminal member 58 that overlies and contacts the last mentioned end of member 54 to secure the latter and terminal member 58 in place in base 42.

Figures 11, 13:
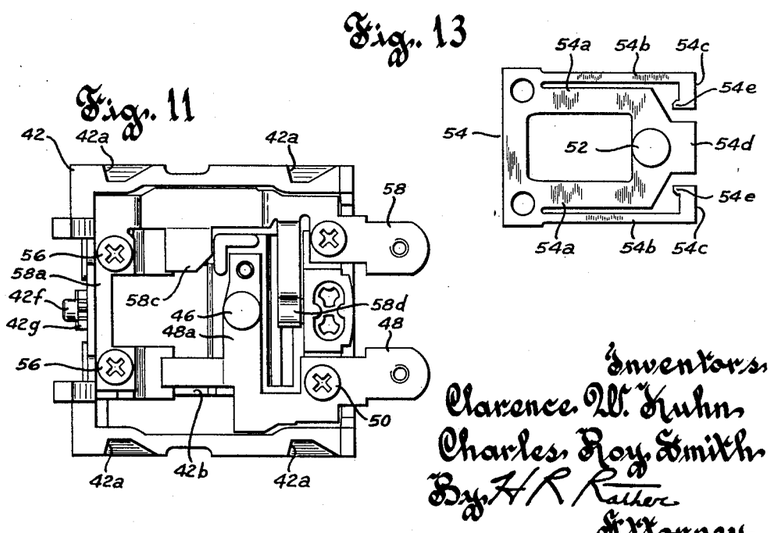
FIG. 11 is a view like FIG. 5 but to smaller scale and with certain mechanism removed.
FIG. 13 is a top plan view of a part in the switch mechanism.

As shown in FIG. 13, member 54 is provided with legs 54b which are spaced apart and extend parallel with the longitudinal sides of the portion 54a. At their outer ends the portions 54b have integral portions 54c that extend inwardly toward a tab 54d integrally formed on the free end of portion 54a. Portions 54c have hooked lips 54e that extend generally parallel with the portions 54b.

Reed member 54 is formed to accurate dimensions by suitably blanking the same from thin flat stock of a spring temper material, such as beryllium copper alloy. Mounting recesses for member 54 and terminal member 58 are so formed that when the same are initially secured in base 42 by screws 56 contact 52 will be forced into engagement with contact 46 with some pre-bending of the portion 54a thereby establishing a minimum normal engagement pressure between contacts 52 and 46.

A C-shaped flipper spring 60 has a slot 60a formed therein (see FIGS. 3, 4, 5, 12, 22 and 23) and the tab 54d of member 54 extends therethrough. The portions 54c and 54e of each of the legs 54b also extend or hook over the web 60b of spring 60 with the portions 54e extending into the slot 60a. The web 60b narrows and terminates at an end 60c that engages in a V-shaped notch 62a formed in one end of a molded drive lever 62. Flipper spring 60 is formed by blanking from thin flat stock of stainless steel which has been suitably heat treated and tempered. The C-shape configuration of spring 60 is imparted in assembling it to the reed member 54 and drive lever 62, but preformed C-shape springs can also be used.

Drive lever 62 at its opposite end is provided with a V-shaped notch 62b that engages on the inner edge of the portion 54a of member 54 to provide a pivot fulcrum point for lever 62. As viewed in FIG. 3, notch 62a is below the plane of member 54 and the forces developed in spring 60 hold the tab 54d in engagement with a lateral stop finger 58d integrally formed with terminal member 58. In such position of member 54 contact 52 is held out of engagement from contact 46 thereby interrupting circuit.

Figure 23:
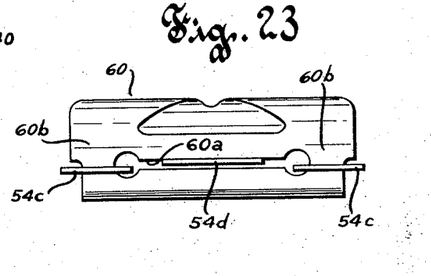
FIG. 23 is alike FIG. 22 but shows the same parts in another operating condition.

If drive lever 62 is pivoted counterclockwise about its pivot fulcrum at notch 62b the end 60c of spring 60 will move upwardly and be compressed, and the upward component of force exerted by spring 60 on the member 54 decreases as the angle between its ends and the plane of member 54 decreases. A null point is reached where the upward force exerted by spring 60 is equal to the downward force exerted by member 54 due to its aforementioned bending. Any further counterclockwise movement of lever 62 permits tab 54d, and hence portion 54a, to move downwardly to engage contact 52 with contact 46. Before the end 60c moves across the plane of the legs 54b, the force exerted by spring 60 reverses to exert a vertical downward component, and a toggle action takes place causing spring 60 to move rapidly with lost motion the width of its slot 60a, minus the thickness of member 54, to engage along the upper margin of its slot as depicted in FIG. 23 and drive tab 54d downwardly and close contact 52 upon contact 46. In the closed position of the contacts, shown in FIGS. 4 and 23, the force developed in spring 60 applied through the upper side of slot 60a against tab 54d is added to the aforementioned prebending stress in member 54 to hold contact 52 against contact 46. Overtravel of lever 62 in the clockwise direction is limited by engagement of one of the projections 62c with a tab 58c which overlies such projection.

Assuming that contact 52 is closed against contact 46 as shown in FIG. 4, if drive lever 62 is pivoted clockwise about its notch 62b the end 60c of spring 60 will move downwardly along an arc and be compressed. This increases the force developed in spring 60, but because of its changing angle relative to the plane of reed member 54 the downward vertical component of force exerted on tab 54d is decreased which reduces the contact engagement pressure. When notch 62a is in line with legs 54b the vertical component of force exerted by spring 60 on member 54 becomes zero. As lever 62 continues to pivot clockwise, the vertical component of force exerted by spring 60 reverses and a position is reached where the upward force exerted by spring 62 on member 54 is balanced by the downward forces exerted by legs 54b and a balance of forces exists. Only the aforementioned prebending stress of member 54 provides contact engagement pressure. Any additional clockwise movement of lever 62 increases the vertical component exerted by spring 60 and legs 54a will move the distance of slot 60a (less the thickness of member 54) and spring 60 will toggle member 54 rapidly upwardly to move contact 52 from engagement with contact 46. Member 54 is limited in upward travel by engagement of the upper surface of its tab 54d with stop finger 58d which is an integral part of member 58. Similarly, the integral projections 62c on drive lever 62 engage the lower surfaces of recesses 42b, formed in base 42 to limit overtravel movement of the lever in the clockwise directiton.

Between drive lever 62 and diaphragm 30d a lever motion multiplying and range differential adjusting system is interposed. Referring particularly to FIGS. 3, 4, 8, 9, 10 and 15, the motion multiplying system includes a thrust plate 66, a range lever 68, a "cut-in" lever 70, a "cut-out" lever 72, a stabilizing leaf member 74 and a biasing spring 76. Thrust plate 66 bears centrally against the diaphragm 30d, and diametrically opposite legs 66a bear at their arcuate upper ends against the outer arms 68c of range lever 68. Lever 68 bears at its one end 68b against the edge of a range adjusting cam 78. At the tip of its opposite angularly upward end 68d, lever 68 bears against the lower sides of the levers 70 and 72. Lever 70 pivots against the lower end of an adjusting screw 80, and lever 72 bears at its corresponding end against the lower end of an adjusting screw 82.

Bias spring 76 seats at its upper end in a recess 42d formed in base 42, and terminates at its other end in a coaxial straight end that bears in a recess in the upper surface of "cut-out" lever 72. The spring 76 develops a counterclockwise torque on lever 72 about its pivot on the end of screw 82.

Figures 7, 9, 12:
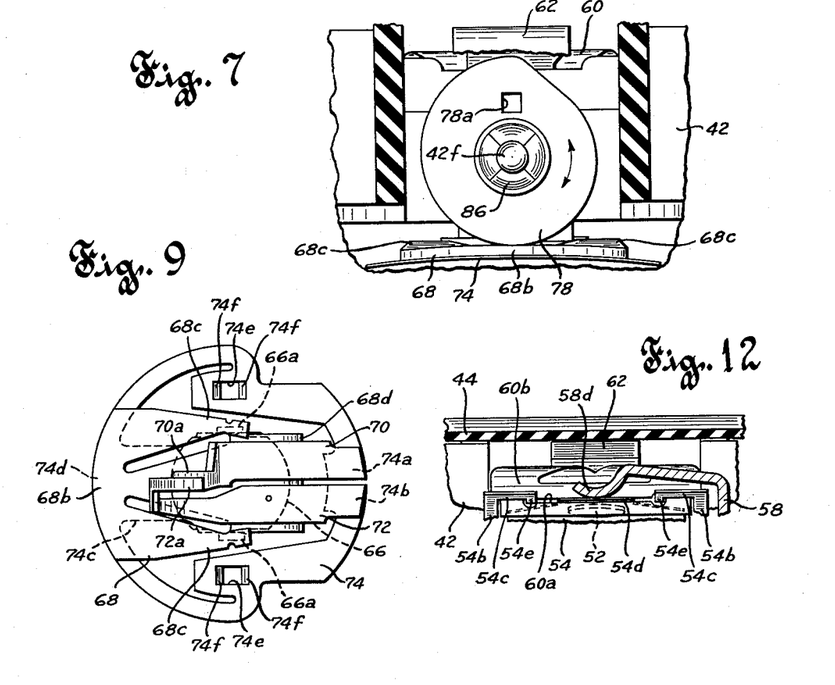
FIG. 7 is a fragmentary view partially in cross section taken along the line 7—7 of FIG. 3.
FIG. 9 is a top plan view of a lever assembly used in the control switch.
FIG. 12 is a fragmentary view taken along the line 12—12 of FIG. 3.
Figure 8:
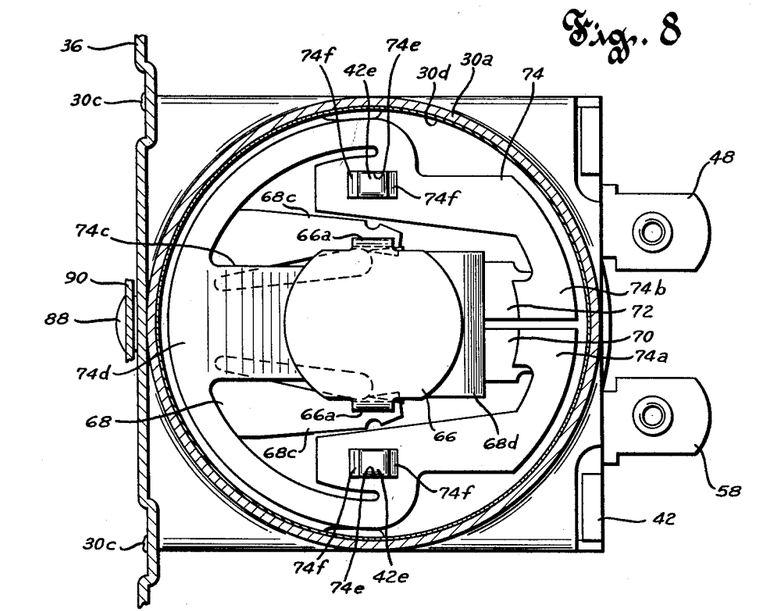
FIG. 8 is a view in cross section taken along the line 8—8 of FIG. 4.
Figure 10:
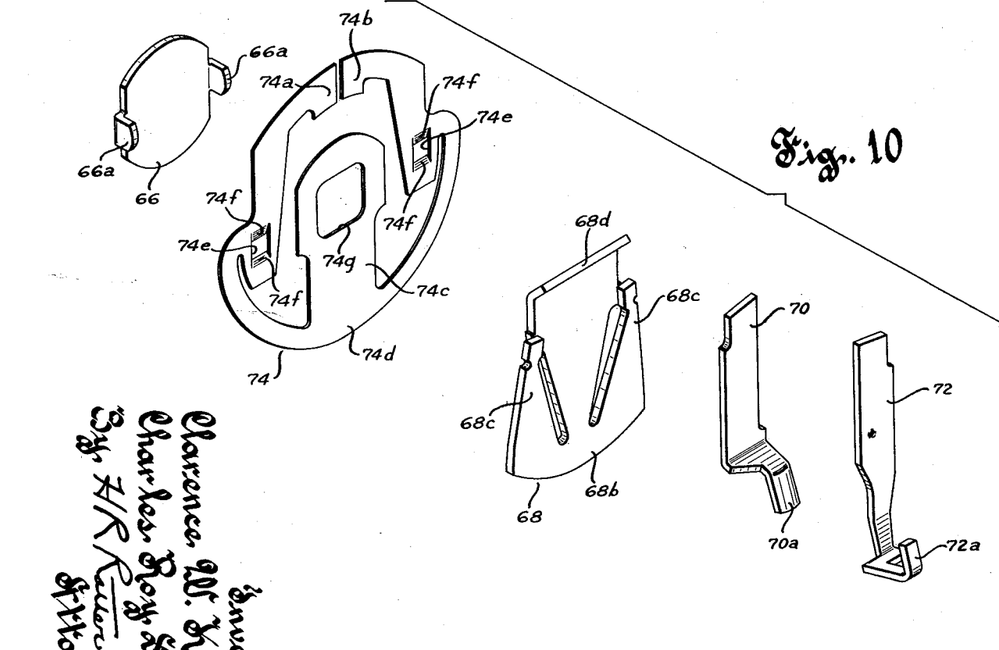
FIG. 10 is a view showing the parts of the lever assembly of FIG. 9 in exploded relation.

As best seen in FIGS. 8, 9 and 10, plate 66 and levers 68, 70 and 72 are held together in assembled relation by leaf member 74 which is preferably formed of thin flexible spring stock. Levers 70 and 72 are spot welded to the ends of the outer legs 74a and 74b, respectively, and the plate 66 is spot welded on its upper surface to the end of the central leg 74c of member 74 with the legs 66a of plate 66 straddling the outer margin of leg 74c. Range lever 68 is spot welded at its end 68b to the intermediate connecting bight 74d of member 74. This assembly is secured and located in base 42 by means of spaced downwardly projecting lugs 42e formed in the base molding which penetrate openings 74e formed in leaf member 74. Oppositely disposed tabs 74f formed in the margin of the latter openings grip the sides of lugs 42e and dig in to prevent withdrawal therefrom. Stabilizing member 74 provides lateral stabilizing for plate 66 and levers 68, 70 and 72 and flexes to permit such plate and levers to move and pivot as required of the lever. The amount of flexing required of member 74 in normal operation is minimized by making the attachments thereto as close as possible to the pivot points of the levers.

As best seen in FIGS. 3, 4 and 9, lever 70 has an angularly upturned portion 70a which engages on the under surface of a semi-cylindrical boss 62d formed on drive lever 62. Lever 72 has a generally C-shaped free end 72a which overlies the boss 62d in a recess 62e formed in lever 62 and engages with boss 62d to pivot lever 62 clockwise under decreasing power element pressure changes as will hereinafter be explained.

Range adjusting cam 78 is provided with a central opening and is mounted on a cylindrical boss 42g formed on base 42. A spring washer 86 frictionally gripping the periphery of an inner concentric boss 42f bears against cam 78 to hold it against axial displacement. A member 88 journaled for rotational movement in mounting bracket 36 has a lug 88a which interfits with cam 78 in an opening 78a formed in the latter. On the outer side of bracket 36 member 88 penetrates and is non-rotatably upset over a U-shaped member 90 to which range adjusting knob 34 is fitted. The portion 88b has a triangular shaped high point 88c (see FIG. 17) which when knob 34 is turned to its counterclockwise extreme limit (when looking in from the left in FIG. 1) engages the end 62f of a hook portion 62g of drive lever 62 to pivot the latter to a clockwise extreme position wherein it manually toggles member 54 to and holds it in a position disengaging contacts 52 and 46. The last mentioned extreme limit is determined when member 90 engages a raised projection 36a struck up from the bracket 36.

In one preferred embodiment of cam 78 its peripheral form will be like that depicted in FIG. 7. As viewed in FIG. 7, if cam is rotated clockwise the radial distance between its point of engagement with the end 68b of range lever 68 and its axis of rotation decreases thereby causing the end 68b to move upwardly as member 68 pivots on the ends of legs 66a of thrust plate. Consequently lever 68 pivots clockwise as viewed in FIGS. 3 and 4, thereby lowering its end 68d which in turn causes cut-in and cut-out levers 70 and 72 to pivot counterclockwise about the ends of the differential adjusting screws 80 and 83. As will hereinafter be apparent the higher the position of the end 68b of range lever 68 as established by cam 78, the higher will be the pressures in power element 30 at which contact 52 will be engaged and subsequently disengaged from contact 46.

Let it be assumed that the contacts 52 and 46 are initially open as depicted in FIG. 3, and that cam 78 is given an intermediate adjustment depicted. Now if element 40 is subjected to an increasing temperature, the pressure in chamber 38 will increase and diaphragm 30d will move upwardly. Thrust plate 66 moves upwardly with diaphragm 30d which in turn pivots range lever 68 counterclockwise at its point of engagement with the edge of cam 78. Such movement of lever 68 causes both the cut-in and cut-out levers 70 and 72 to be pivoted clockwise about their pivot points on the ends of differential adjusting screws 80 and 82. As cut-in lever 70 continues to pivot clockwise it ultimately engages the lower side of boss 62d of drive lever 62. Further clockwise pivoting of lever 70 results in counterclockwise pivoting of lever 62 to provide the closing of contact 52 to contact 46 as hereinbefore described. Thus the aforedescribed levers 68, 70, 72 and 62 attain the positions depicted in FIG. 4.

Now assume, as a result of closure of contacts 52 and 46 and operation of refrigerating apparatus controlled by such contacts, that the temperature to which temperature responsive element 40 is subjected decreases. This causes a reduction in vapor or gas pressure in chamber 38 and diaphragm 30d moves downwardly. Bias spring 76 acting on cut-out lever 72 causes the latter and range lever 68 to pivot counterclockwise and clockwise respectively in following the downward movement of diaphragm 30d. Ultimately the C-shaped end 72a of cut-out lever 72 engages the boss 62d on its upper side and pivots drive lever 62 clockwise. When lever 62 is pivoted clockwise sufficiently contacts 52 and 46 are toggled opened as hereinbefore described. As will be understood the force exerted by spring 76 must be sufficient to effect operation of the snap action switch mechanism but should not have a spring rate greater than necessary to minimize the loading on diaphragm 30d. Spring rates in the range of 2 to 3 lb. per inch have proved to be satisfactory for spring 76.

It will be apparent that the levers 68 and 70 or 72 provide considerable motion amplification for any upward or downward movement of diaphragm 30d. For a given setting of range adjusting cam 78, diaphragm 30d, thrust plate 66 and levers 68, 70 and 72 take new positions for each unit change in pressure developed in element 40.

The spacing between the ends 70a and 72a which underlie and overlie the boss 62d of drive lever 62 determines the differential between cut-in and cut-out toggle operation to close and open the contacts 52 and 46. This differential is adjustable in accordance with the adjustment of the screws 80 and 82. Cut-in and cut-out differential adjustments are initially established by subjecting element 40 to a low cut-out temperature, say 20° F. for a given intermediate adjustment of cam 78. When element 40 is stabilized at 20° adjusting screw 82 is adjusted to pivot lever 72 counterclockwise and engage boss 62d of drive lever 62 and is continued until toggle action of the contact operating mechanism occurs and opens contacts 52 and 46. If it is desired that contacts 52 and 46 reclose at a 10° higher temperature, then element 40 will next be subjected and stabilized at such a temperature, e.g., 30° F. and adjusting screw 80 is turned to pivot lever 70 clockwise on end 68d of lever 68 to engage boss 62d and pivot drive lever 62 until the point is reached where the contact operating mechanism is toggled to close contacts 52 and 46. Thereafter for any given positioning of cam 78 the cut-in and cut-out temperatures will always have the same fixed differential.

Figure 14:
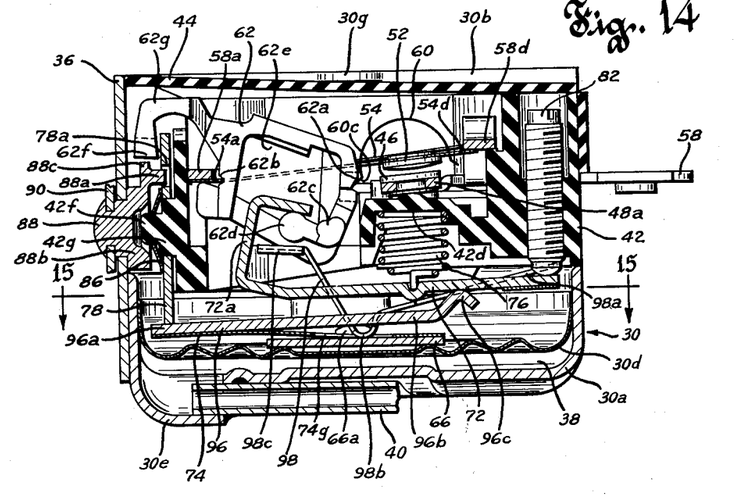
FIG. 14 is a view like FIGS. 3 and 4 but showing a modified version of the thermostatic control switch.
Figure 15:
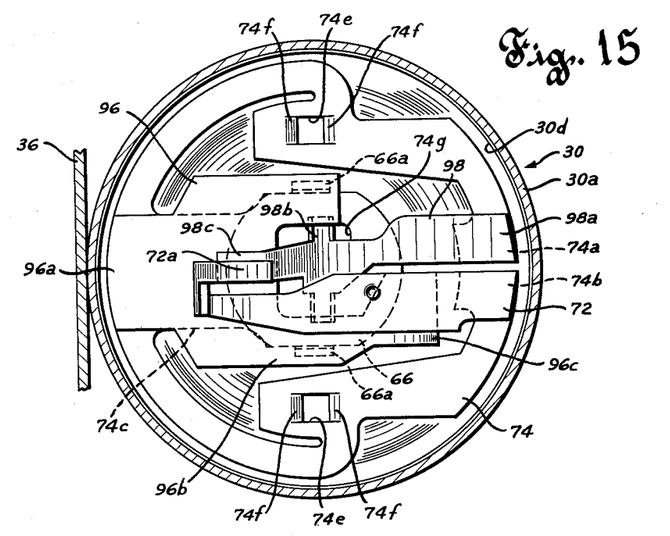
FIG. 15 is a view in cross section taken along the line 15—15 of FIG. 14.
Figures 16, 17:
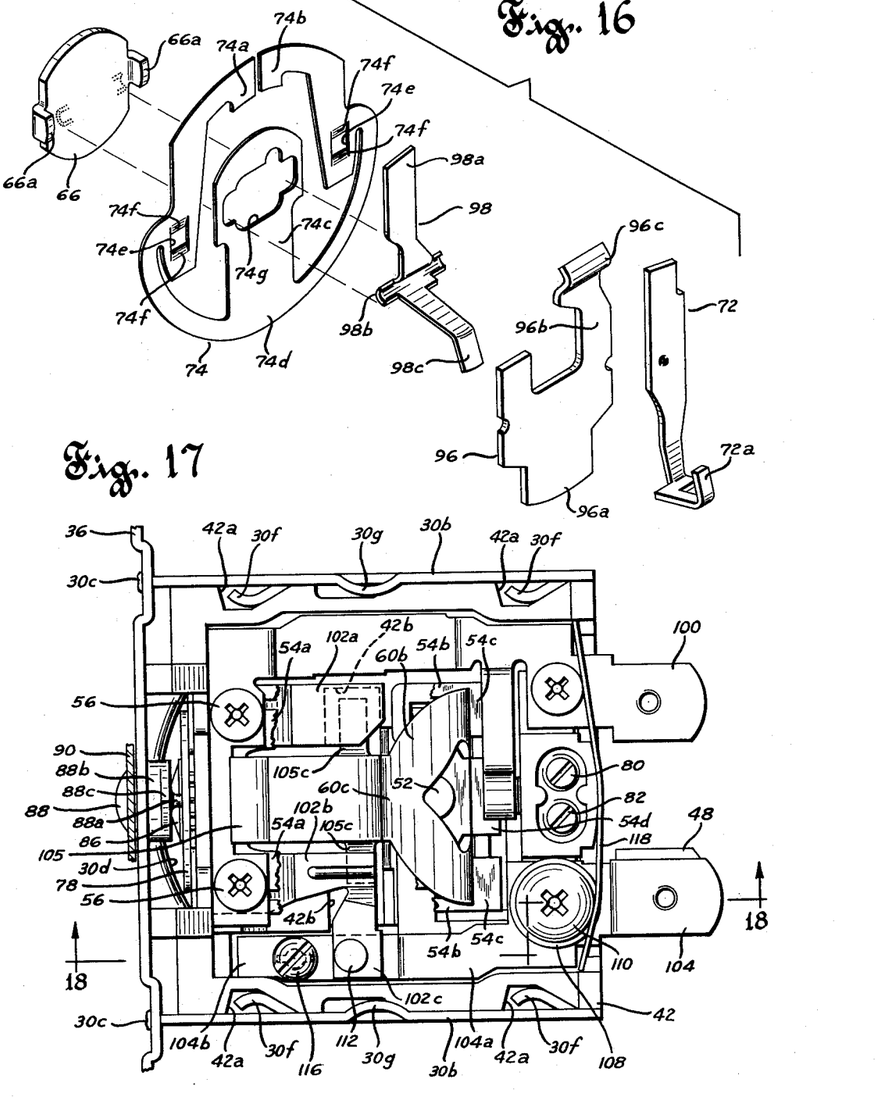
FIG. 16 is a view showing in exploded relation the parts of the modified lever assembly used in the version shown in FIGS. 14 and 15.
FIG. 17 is a view like FIG. 5, but showing a second modified version of thermostatic control switch.

FIGS. 14 to 16 illustrate a modified form of a controller wherein the "cut-in" point is fixed and does not change with change in positioning of the range adjusting cam 78 which only changes the "cut-out" point. The modified controller for the most part is exactly the same as the "straight range" form hereinbefore described and like parts bear identical reference numerals. Differences reside only in the form and arrangement of the range and "cut-in" levers, and to a slight extent in the stabilizing leaf member 74. The modified version employs range lever 96 and a "cut-in" lever 98 of the form best shown in FIG. 16. Range lever 96 has an end 96a which on its lower surface is spot welded to the connecting bight 74d of leaf member 74 and engages on its upper surface with the edge of range cam 78. Lever 96 has an arm 96b which has an inverted V-shaped bearing surface 96c against which the lower surface of "cut-out" lever 72 bears. "Cut-in" lever 98 on the lower surface of its end 98a is spot welded to arm 74a of member 74, and intermediate its ends is provided with a widened substantially U-shaped bearing portion 98b that seats on its lower surface on the upper surface of thrust plate 66. The opening 74g in the leg 74c is suitably widened to afford clearance for bearing portion 98b. At its other end lever 98 is provided with an end portion 98c which engages with the boss 62d of drive lever 62. The end 98a of lever 98 engages the end of adjusting screw 80 and pivots thereon as thrust plate 66 and diaphragm 30d move up in response to pressure changes in diaphragm chamber 38 to engage and pivot drive lever counterclockwise. "Cut-out" lever 72 in operative action pivots on the end of adjusting screw 82 and is driven upwardly by range lever 96 and moved downwardly by spring 76 to follow range lever 96 and thrust plate 66 as diaphragm 30d moves downwardly. It will be apparent that adjustment of cam 78 will only affect the point at which "cut-out" lever will be effective to toggle contact 52 open, and that once adjusting screw 80 is given a calibration adjustment the "cut-in" point will be fixed. The modified version has been found useful when it is desired to provide evaporator defrost in refrigerators after each cycle of compressor operation. By setting the "cut-in" point above freezing temperature (34° to 40° F.) the evaporator will have to reach this temperature before the compressor is again engaged by closure of contacts 52 and 46. This affords some melting of frost each cycle, and before the same can accumulate to any considerable extent.

Figure 18:
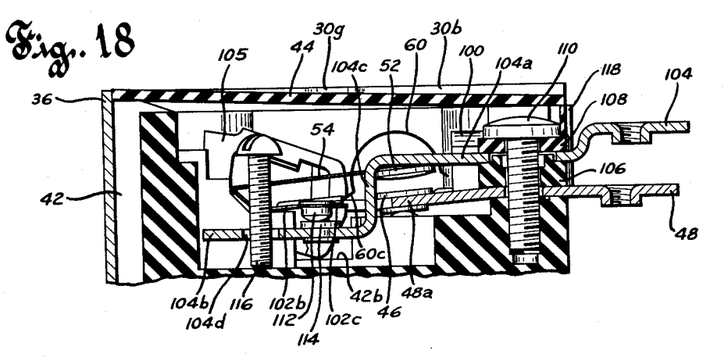
FIG. 18 is a fragmentary cross sectional view taken along the line 18—18 of FIG. 17.
Figure 19:
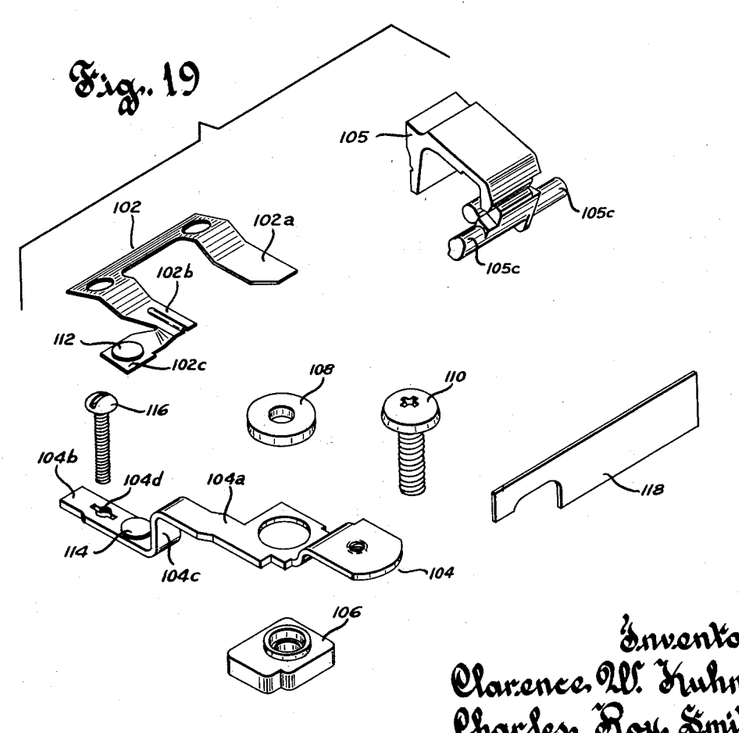
FIG. 19 is a view showing certain parts of the modified version of FIGS. 17 and 18 in exploded relation.

FIGS. 17 to 19 illustrate another modified version of the control devices before described in conjunction with FIGS. 1 to 15, 22 and 23 and FIGS. 14 to 17. This second modified version affords alarm actuation in the event the temperature in the refrigerated spaces exceeds a predetermined temperature due to failure of the refrigerator compressor or the like. This version is like that before described in conjunction with FIGS. 1 to 13, 22 and 23 but employs a modified terminal member 100 in place of terminal member 58, and an additional spring member 102, terminal member 104 and modified drive lever 105. As shown in FIG. 17 member 100 does not have a stop tab such as 58c and spring member 102 is secured between member 54 and base 42 by screws 56. Terminal member 104 is secured to base 42 in partial overlying relation to terminal member 48. As best shown in FIG. 18, an intermediate portion 104a is secured to base 42 in insulated spaced relation to an underlying portion of terminal 48 by means of an insulating spacer 106, washer 108, and screw 110.

Member 102 has parallel arms 102a and 102b which are engageable by the projections 105c of drive lever 105. It has a right angle offset arm 102c integrally connected with arm 102b to which is secured an electrical contact 112. As shown in FIGS. 17 and 18, contact 112 overlies and is normally pre-stressed into engagement with a cooperating contact 114 secured to the portion 104b of terminal member 104 which is integrally connected to portion 104a by the downwardly depending offset portion 104c. A calibration screw 116 is threaded in an undersized slotted opening 104d in member 104 and bears against base 42. Screw 116 permits calibration of the opening point of contacts 112 and 114. A modified end closure member 118 is used to close the end of base 42 around the three terminal members 48, 100 and 104.

In normal operation contacts 112 are closed to contacts 114, and will remain so closed unless the closure of previously described main contacts 52 and 46 are ineffective to energize the refrigerator compressor. In the latter event the temperature of the refrigerated space will continue to rise, and assuming that the controller is in the operating condition wherein main contacts 52 and 46 have closed, as shown in FIG. 4, any further increases in temperature will effect further counterclockwise pivoting of drive lever 62. The projections 105c of lever 105 then engaging the lower surface of arms 102a and 102b will move the same upwardly against the initial downward bending stress imparted thereto. Ultimately arm 102c rises sufficiently to disengage contacts 112 from the contacts 114. Thus if common terminal 100 and alarm terminal 104 are connected appropriately with an alarm device interruption of engagement of contacts 112 and 114 will cause operation of such alarm device in a well known manner to call attention that dangerously high temperatures are being developed in the refrigerated space.

With temperature element 40 subjected to the temperature at which it is desired to have alarm contacts 112 and 114 open and the controller stabilized at such temperature screw 116 is turned against base 42 to cause portion 104b of member 104 to ride up the shank of the screw until contact 114 engages contact 112. Screw 116 is then readjusted a slight amount in the opposite direction until contacts 114 just disengage from contacts 112.

Figure 20:
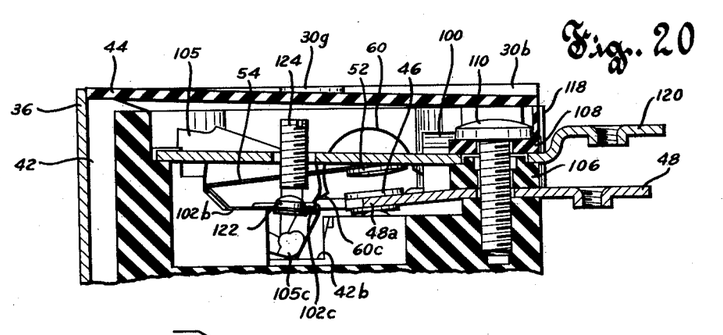
FIG. 20 is a view like FIG. 18 but showing a third modified version of a thermostatic control switch.
Figure 21:
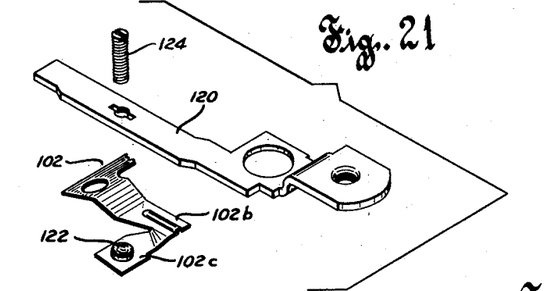
FIG. 21 is a view showing certain portions of the modified version of FIG. 20 in exploded relation.
Figure 22:
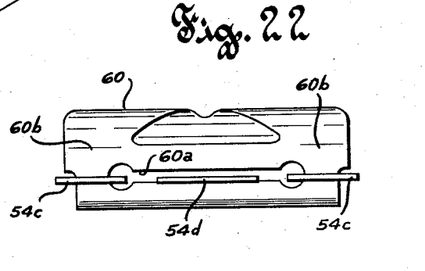
FIG. 22 shows one operating condition of certain parts used in the switch mechanisms of all versions of the control switch.

FIGS. 20 and 21 disclose another alarm version of the basic controller which is provided with normally open alarm contacts. In this latter embodiment another stationary terminal member 120 is used in place of terminal member 104. It is mounted to member 42 in the same manner as the replaced member 104. Spring member 102 is provided with a contact 122, and upon upward movement of arm 102c engages with an adjustable screw 124 that serves as a stationary contact. Engagement of contacts 122 and screw 124, as will be apparent, completes a circuit between common terminal member 100 and alarm terminal member 120. With the controller stabilized at the temperature at which it is desired to have contacts 122 close to screw 124, the latter is turned until it disengages from contacts 122 and then reversely turned until it just engages with contacts 122.

It will be noted that the molded drive lever 105 shown in connection with both alarm versions does not have the overhanging end as does lever 62 having an end 62f to afford a manual "off" position in conjunction with portion 88c of member 88. However, if a manual "off" position is desired a lever like lever 62 may be used in place of the lever 105 in either of the aforedescribed alarm versions. If it is desired to omit the manual "off" position in either the "straight range" version described in conjunction with FIGS. 1 to 13 and 22 and 23, or the "constant cut-in" version described in conjunction with FIGS. 14 to 17, the modified drive lever 105 should be substituted for drive lever 62.

Figure 24:
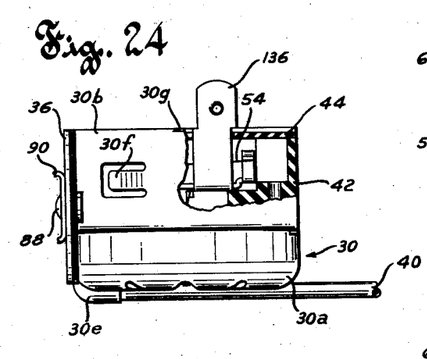
FIG. 24 shows a fourth modified version of the control switch.

FIG. 24 illustrates a modification in respect to external portions of modified terminal members 136 that can be used in place of those used in the version of FIGS. 1 to 13 and FIGS. 14 to 17. In this modification the external portions of the terminal members 136 extend out through the cover 44 instead of one end of the controller.

In certain applications the use of the thermally responsive power elements having a diaphragm movement which varies in a linear relation to temperature changes may be preferred. Such a power element is disclosed in the Cox Patent No. 2,698,766.

We claim:

1. In combination in a thermostatic switch, a snap acting switch mechanism having an operating member movable to one extreme position wherein said mechanism assumes one stable operating condition and movable to another extreme position wherein said mechanism assumes another stable operating condition, a thermally responsive power element having a diaphragm which moves inwardly and outwardly in accordance with changes in pressure of the fluid fill in said element, and a motion transmitting mechanism between said diaphragm and said operating member comprising a first lever to drive said operating member to said one extreme position when said diaphragm moves outwardly, a second lever and a spring biasing said second lever to drive said operating member to its other extreme position when said diaphragm moves inwardly.

2. The combination according to claim 1 wherein said spring only exerts a bias sufficient to afford the aforementioned drive of said operating member by said second lever, and said diaphragm on outward movement not being subjected to any mechanical forces beyond that imposed by said spring and the counterforce imposed by said switch mechanism through said operating member before the latter moves to said one extreme position.

3. The combination according to claim 2 wherein said motion transmitting means mechanism further comprises means adjustable to various positions to afford changes in the outward and inward positioning of said diaphragm required to effect the aforesaid drive of said operating member to its opposite extreme positions.

4. The combination according to claim 3 wherein said motion transmitting means further comprises additional adjustable means for each of said first and second levers affording changes in the differential between the aforestated operating member operations provided by said first and second levers.

5. The combination according to claim 1 wherein upon reversal from inward to outward movement of said diaphragm and vice versa said first and second levers move with lost motion before driving said operating member.

6. The combination according to claim 1 wherein said power element diaphragm assumes definite positions in a linear relation to the pressure developed by the internal fluid fill.

7. The combination according to claim 1 wherein said motion transmitting means further comprises an adjustable member, a third lever pivoted at one end on said adjustable member and engaging at least one of said first and second levers at its other end, and a member movable rectilinearly with said diaphragm and engaging said third lever intermediate the ends of the latter, said adjustable member being adjustable to various positions to correspondingly change the distance between said diaphragm and the pivot point at said one end of said third lever to afford changes in the outward and inward travel of said diaphragm required to effect the aforestated operations of said operating member.

8. The combination according to claim 7 wherein said third lever engages both said first and second levers at its other end.

9. The combination according to claim 7 wherein said third lever engages only said second lever at its other end and said first lever is engaged intermediate its ends directly by said member movable rectilinearly with said diaphragm.

10. The combination according to claim 7 wherein adjustable pivot abutments are provided at the corresponding ends of said first and second levers which according to their adjustments determine the differential between the aforestated operating actions imparted to said operating member by said first and second levers.

11. The combination according to claim 1 wherein said motion transmitting means further comprises an adjustable member, a third lever pivoted at one end on said adjustable member and engaging at least one of said first and second levers at its other end, a member movable rectilinearly with said diaphragm and engaging said third lever intermediate the ends of the latter, and a thin flexible metal member to which the last mentioned member and said first, second and third levers are attached, said flexible metal member providing lateral stability for the member and levers attached thereto while flexing upon rectilinear movement of said last mentioned member and pivotal movements of said levers.

12. The combination according to claim 11 wherein said flexible member has portions with spacing therebetween to facilitate flexing of such portions individually in accordance with the movement or pivoting of the member and individual levers attached thereto.

13. The combination according to claim 1 wherein said motion transmitting means further comprises an adjustable member, a third lever pivoted at one end on said adjustable member and engages said second lever at its other end, and a member movable rectilinearly which engages said first lever and third levers intermediate their respective ends, said adjustable member being adjustable to various positions to correspondingly change the distance between said diaphragm and the pivot point at said one end of said third lever to afford change in the inward travel of said diaphragm required to effect the aforestated operation of said operating member by said second lever.

14. In combination, in a thermostatic control device, a snap action switch mechanism comprising a molded insulating base, an electrical terminal member having a stationary contact tip mounted on said base, a second electrical terminal member mounted on said base in spaced relation to first mentioned terminal member, a thin flexible electrical conducting member having an end engaging and secured to said base by said second terminal member and having a portion on which a contact tip is mounted in line with the first mentioned contact tip, said portion of said flexible member having a central opening, an operating lever pivoted on an inner edge of said portion, a snap member having a transverse slot adjacent one end through which said portion of said flexible member extends and engaging at its other end with said operating lever, said operating lever being pivotally movable in opposite directions across the plane of said flexible member to provide lost motion, snap action toggling of said portion of said flexible member from one stable position to another, a thermally responsive power element having a diaphragm which moves inwardly and outwardly in accordance with changes in pressure of the fluid fill in said element, and a motion transmitting mechanism between said diaphragm and said operating lever comprising a first lever to drive said operating lever in one direction when said diaphragm moves outwardly, a second lever and a spring biasing said second lever to drive said operating lever in its opposite direction when said diaphragm moves inwardly.

15. The combination according to claim 14 wherein said spring only exerts a bias sufficient to afford the aforementioned drive of said operating member by said second lever, and said diaphragm on outward movement not being subjected to any mechanical forces beyond that imposed by said switch mechanism through said operating member before the latter moves to said one extreme position.

16. The combination according to claim 14 wherein said motion transmitting means further comprises an adjustable member, a third lever pivoted at one end on said adjustable member and engaging at least one of said first and second levers at its other end, and a member movable rectilinearly with said diaphragm and engaging said third lever intermediate the ends of the latter, said adjustable member being adjustable to various positions to correspondingly change the distance between said diaphragm and the pivot point at said one end of said third lever to afford changes in the outward and inward travel of said diaphragm required to effect the aforestated operations of said operating member.

17. The combination according to claim 16 together with a second adjustable member operable to a given extreme position to move said operating lever in said opposite direction and hold it in a position affording disengagement of said contact tips independently of positioning of said first and second levers.

18. The combination according to claim 17 together with means for effecting simultaneous adjustments of the first mentioned and second adjustable members which are effective respectively at different ranges of adjustment of the last mentioned means.

19. The combination according to claim 17 wherein said flexible member is anchored at two spaced points to said insulating base.

20. The combination according to claim 14 wherein said motion transmitting means further comprises an adjustable member, a third lever pivotal at one end on said adjustable member and engaging at least one of said second and third levers at its other end, a member movable rectilinearly with said diaphragm and engaging said third lever intermediate the ends of the latter, and a thin flexible metal member to which the last mentioned member and said first, second and third levers are attached, said flexible metal member providing lateral stability for the members and levers attached thereto while flexing upon rectilinear movements of said last mentioned member and pivotal movements of said levers.

21. The combination according to claim 14 together with a third electrical terminal member mounted on said base and having a contact tip thereon and a resilient electrical conducting member having a contact tip in line with that of said second terminal member mounted on said base in engagement with said second terminal member, said resilient member normally assuming a position wherein its contact tip is in one electrical condition with respect to that of said third terminal member, and said operating lever upon movement in said one direction beyond the point required to operate said switch flexing said resilient member in a direction affording the opposite electrical condition between its contact tip and that of said third terminal member.

22. The combination according to claim 21 wherein said resilient member normally assumes a position wherein its contact tip engages that of said third terminal member and is flexed to disengage therefrom by the last mentioned movement of said operating lever.

23. The combination according to claim 21, wherein said resilient member normally assumes a position wherein its contact tip is disengaged from that of said third terminal member and is flexed to engage its contact tip with that of said third terminal member by the last mentioned movement of said operating lever.

24. The combination according to claim 21 together with means for adjusting said third terminal member so that change from one to the other electrical condition of the contact tips of said third terminal member and said resilient member requires different degrees of movement of said resilient member by said operating lever in accordance with such adjustment.

References Cited in the file of this patent
UNITED STATES PATENTS

| | | |
|---|---|---|
| 2,587,746 | May | Mar. 4, 1952 |
| 2,617,312 | Prentice | Nov. 11, 1952 |
| 2,885,513 | Judd | May 5, 1959 |
| 2,889,432 | Miller | June 2, 1959 |
| 2,905,781 | Cherry | Sept. 22, 1959 |
| 2,905,782 | Chapin et al. | Sept. 22, 1959 |